United States Patent
Zweigle et al.

(10) Patent No.: US 9,985,860 B2
(45) Date of Patent: May 29, 2018

(54) SELECTION AND DISPLAY OF POLLED AND STREAMED ELECTRIC POWER SYSTEM MEASUREMENTS

(71) Applicant: Schweitzer Engineering Laboratories, Inc., Pullman, WA (US)

(72) Inventors: Gregary C. Zweigle, Pullman, WA (US); Eric J. Hewitt, Moscow, ID (US); Ellery A. Blood, Moscow, ID (US); Stanley P. Gotshall, Moscow, ID (US); Riley Grant Huddleston, Pullman, WA (US); William D. Morrison, Pullman, WA (US); Jared Kyle Bestebreur, Pullman, WA (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 640 days.

(21) Appl. No.: 14/492,974

(22) Filed: Sep. 22, 2014

(65) Prior Publication Data

US 2015/0089027 A1    Mar. 26, 2015

Related U.S. Application Data

(60) Provisional application No. 61/881,038, filed on Sep. 23, 2013.

(51) Int. Cl.
    *H04L 12/26*      (2006.01)
    *H02J 13/00*      (2006.01)
    (Continued)

(52) U.S. Cl.
    CPC .............. *H04L 43/10* (2013.01); *H02J 13/00* (2013.01); *H02J 13/0006* (2013.01);
    (Continued)

(58) Field of Classification Search
    CPC . G01R 19/2513; H02J 3/12; H02J 3/24; H02J 13/00; H02J 13/0013; H02J 13/0006;
    (Continued)

(56) References Cited

U.S. PATENT DOCUMENTS

| | | |
|---|---|---|
| 3,164,771 A | 1/1965 | Milford |
| 3,258,692 A | 6/1966 | Jacomini |

(Continued)

FOREIGN PATENT DOCUMENTS

| | | |
|---|---|---|
| WO | WO2005015366 | 2/2005 |
| WO | WO2006052215 | 5/2006 |

OTHER PUBLICATIONS

PCT/US13/45019 Patent Cooperation Treaty International Search Report and Written Opinion of the International Searching Authority dated Dec. 30, 2013.

(Continued)

*Primary Examiner* — Ramy M Osman
(74) *Attorney, Agent, or Firm* — Richard M. Edge

(57) ABSTRACT

Combining and analyzing streamed and polled electric power delivery system information is disclosed herein. A system therefore includes a plurality of IEDs in communication with the electric power distribution system and configured to provide streaming and/or polled data via a communications network. An analysis engine in communication with the communications network receives selected streaming information and requested polled information, analyzes such streamed and polled information, and provides a display of such streaming and polled information to a user.

22 Claims, 11 Drawing Sheets

(51) Int. Cl.
 *H04L 29/08* (2006.01)
 *H04L 29/06* (2006.01)
(52) U.S. Cl.
 CPC .......... *H02J 13/0013* (2013.01); *H04L 43/04* (2013.01); *H04L 43/065* (2013.01); *H04L 67/125* (2013.01); *H04L 65/602* (2013.01)
(58) Field of Classification Search
 CPC ....... H04L 67/34; H04L 67/125; H04L 43/04; H04L 43/10; H04L 43/065
 See application file for complete search history.

(56) References Cited

U.S. PATENT DOCUMENTS

| | | |
|---|---|---|
| 3,264,633 A | 8/1966 | Heller |
| 3,266,018 A | 8/1966 | Higgins |
| 3,313,160 A | 4/1967 | Goldman |
| 4,794,386 A | 12/1988 | Bedrij |
| 4,845,644 A | 7/1989 | Anthias |
| 5,519,861 A | 5/1996 | Ryu |
| 5,594,847 A | 1/1997 | Moursund |
| 5,793,750 A | 8/1998 | Schweitzer |
| 5,917,483 A | 6/1999 | Duncan |
| 5,930,773 A | 7/1999 | Crooks |
| 5,943,656 A | 8/1999 | Crooks |
| 6,035,285 A | 3/2000 | Schlect |
| 6,052,671 A | 4/2000 | Crooks |
| 6,088,688 A | 7/2000 | Crooks |
| 6,229,536 B1 | 5/2001 | Alexander |
| 6,313,752 B1 | 11/2001 | Corrigan |
| 6,559,868 B2 | 5/2003 | Alexander |
| 6,618,648 B1 | 9/2003 | Shirota |
| 6,642,700 B2 | 11/2003 | Slade |
| 6,662,124 B2 | 12/2003 | Schweitzer |
| 6,754,597 B2 | 6/2004 | Bertsch |
| 6,845,333 B2 | 1/2005 | Anderson |
| 6,898,488 B2 | 5/2005 | Kusaka |
| 6,907,368 B2 | 6/2005 | Bechtold |
| 6,947,269 B2 | 9/2005 | Lee |
| 6,973,376 B2 | 12/2005 | Kusaka |
| 7,073,182 B1 | 7/2006 | Osburn |
| 7,127,329 B2 | 10/2006 | Kusaka |
| 7,185,281 B2 | 2/2007 | Farago |
| 7,298,259 B2 | 11/2007 | Moriwaki |
| 7,403,114 B2 | 7/2008 | Moriwaki |
| 7,660,683 B2 | 2/2010 | Cuthbertson |
| 8,429,267 B2 * | 4/2013 | Thompson ........ G06F 17/30067 340/870.02 |
| 8,880,368 B2 | 11/2014 | Hewitt |
| 9,620,955 B2 * | 4/2017 | Dolezilek .............. H02H 7/261 |
| 2001/0021896 A1 | 9/2001 | Bertsch |
| 2002/0080149 A1 | 6/2002 | Alexander |
| 2002/0120723 A1 * | 8/2002 | Forth ...................... H04L 67/34 709/221 |
| 2002/0126157 A1 | 9/2002 | Farago |
| 2002/0145517 A1 | 10/2002 | Papallo |
| 2002/0159051 A1 | 10/2002 | Guo |
| 2003/0105608 A1 | 6/2003 | Hart |
| 2004/0111187 A1 | 6/2004 | Kusaka |
| 2004/0162642 A1 * | 8/2004 | Gasper .................. H02J 13/001 700/286 |
| 2005/0033481 A1 | 2/2005 | Budhraja |
| 2005/0114500 A1 | 5/2005 | Monk |
| 2005/0132241 A1 | 6/2005 | Curt |
| 2005/0143947 A1 | 6/2005 | James |
| 2005/0203670 A1 | 9/2005 | Kusaka |
| 2005/0273183 A1 | 12/2005 | Curt |
| 2006/0095276 A1 | 5/2006 | Axelrod |
| 2006/0106741 A1 * | 5/2006 | Janarthanan .......... G01D 4/002 705/412 |
| 2006/0161645 A1 | 7/2006 | Moriwaki |
| 2006/0202834 A1 | 9/2006 | Moriwaki |
| 2006/0224336 A1 | 10/2006 | Petras |
| 2006/0259255 A1 * | 11/2006 | Anderson ............... G06F 19/00 702/64 |
| 2007/0171052 A1 | 7/2007 | Moriwaki |
| 2007/0198708 A1 | 8/2007 | Moriwaki |
| 2008/0103631 A1 * | 5/2008 | Koliwad .................. H04Q 9/00 700/286 |
| 2008/0235355 A1 | 9/2008 | Spanier |
| 2009/0012728 A1 * | 1/2009 | Spanier .............. G01R 19/2513 702/61 |
| 2009/0030759 A1 | 1/2009 | Castelli |
| 2009/0089608 A1 * | 4/2009 | Guzman-Casillas ..... G06F 1/28 713/340 |
| 2009/0099798 A1 * | 4/2009 | Gong ........................ H02J 3/24 702/57 |
| 2009/0125158 A1 * | 5/2009 | Schweitzer, III .. G01R 19/2513 700/293 |
| 2009/0300165 A1 | 12/2009 | Tuckey |
| 2010/0002348 A1 * | 1/2010 | Donolo .................. H02H 7/261 361/64 |
| 2010/0238983 A1 | 9/2010 | Banhegyesi |
| 2010/0324845 A1 | 12/2010 | Spanier |
| 2011/0047264 A1 * | 2/2011 | Hilpert .................... H04L 43/50 709/224 |
| 2011/0066301 A1 * | 3/2011 | Donolo ..................... H02J 3/12 700/292 |
| 2011/0106589 A1 * | 5/2011 | Blomberg ............ G06Q 10/063 705/7.39 |
| 2012/0166141 A1 * | 6/2012 | Watkins ............. G01R 19/2513 702/183 |
| 2013/0198124 A1 * | 8/2013 | Saarinen .................. G06N 5/02 706/46 |
| 2014/0006398 A1 * | 1/2014 | Johnson ................ H04L 65/602 707/736 |
| 2014/0100801 A1 | 4/2014 | Banhegyesi |
| 2014/0136002 A1 * | 5/2014 | Gopalakrishnan ....... H04Q 9/00 700/286 |

OTHER PUBLICATIONS

Ray Klump, et al. Visualizing Real-Time Security Threats using Hybrid SCADA/PMU Measurement Displays, 38th Hawaii International Conference, IEEE No. 0-7695-2268-8/2005.
T.W. Cease, Real-Time Monitoring of the TVA Power System ISSN 0865-0156/94—1994 IEEE.
PCT/US14/57023 Patent Cooperation Treaty International Search Report and Written Opinion of the International Searching Authority dated Dec. 15, 2014.
IEEE Standard for Synchrophasors for Power Systems—IEEE Power Engineering Society, IEEE Std C37 118-2005 (Revision of IEEE Std 1344-1995), Mar. 22, 2006.
D.T. Rizy—Evaluation of Distribution Analysis Software for DER Applications, Oak Ridge National Laboratory—Sep. 30, 2002.

* cited by examiner

SELECTION AND DISPLAY OF POLLED AND STREAMED ELECTRIC POWER SYSTEM MEASUREMENTS

RELATED APPLICATION

This application claims benefit under 35 U.S.C. § 119(e) of U.S. Provisional Application No. 61/881,038, filed 23 Sep. 2013, naming Gregary C. Zweigle, Ellery A. Blood, Stanley P. Gotshall, Eric J. Hewitt, William D. Morrison, Riley Grant Huddleston, and Jared Kyle Bestebreur as inventors, and titled "System for Combining and Analyzing Wide-Area and Local Information" which is hereby incorporated by reference herein in its entirety.

TECHNICAL FIELD

This disclosure relates to selection and display of polled and streamed information from electric power systems. More particularly, this disclosure relates to combining and analyzing wide-area and local polled and streamed information in the monitoring and protection of electric power systems.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
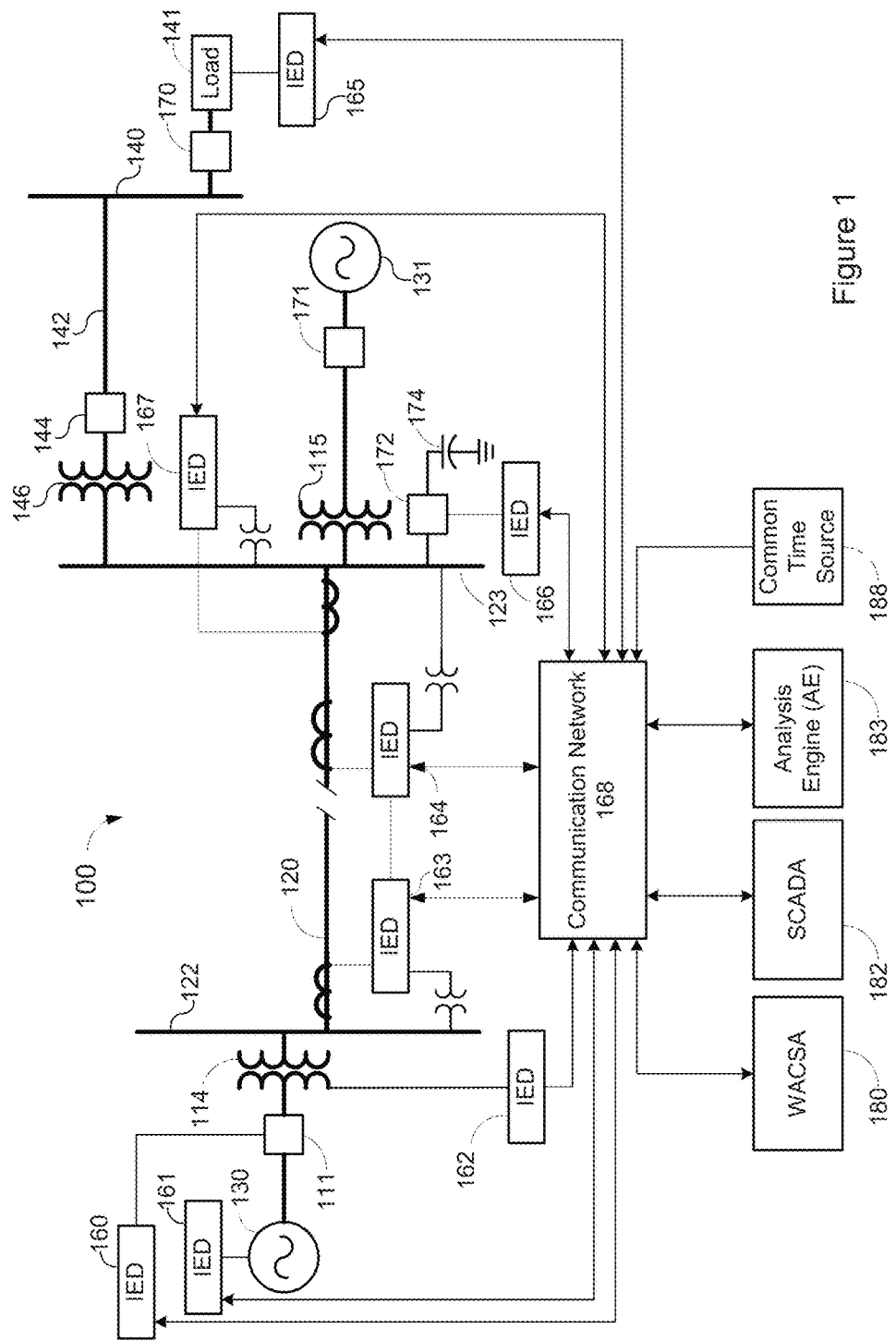
FIG. 1 illustrates a simplified one-line diagram of an electric power system and system for monitoring the electric power system.

The electric power system provides critical infrastructure for society. It is expected that the system operate reliably without failure. However, there are times when unanticipated disturbances result in isolated outages and equipment disconnection. In these cases it is important for engineers to study the event and understand what happened. Often these disturbances are minor and have little impact on the customers of electric power. However, gathering information from all events, even small ones, helps engineers learn about ideas to improve the system and avoid major disruptions.

Historically, event information was gathered by and stored in local intelligent electronic devices ("IEDs"), for example, protective relays that acted during the disturbance. To obtain such power system event data, engineers would need to individually pull each event report over a dial-up connection to the IEDs or physically travel to the IEDs to obtain the data therefrom. With more sophisticated communication networks, engineers now have access to event files that are automatically retrieved over the network using software such as, for example, SEL-5040 AcSELerator TEAM® software available from Schweitzer Engineering Laboratories, Inc. in Pullman, Wash. However, even with these more advanced methods, each event report would still provide only a localized view of the specific disturbance.

In addition to event-driven information, IEDs also have the ability to continuously record and store time-synchronized measurements, including, for example, synchrophasors. Time-synchronized measurements are typically communicated with streaming protocols. Application of a shared timing signal enables such measurements. Engineers may use these measurements to gain a wide-area view of the power system. However, these streaming measurements are typically sampled at a moderate rate and are heavily filtered. As such, like the event report, they have a limited scope in terms of the information provided.

What is desired is a way to combine the local, triggered or polled, high sample rate event information with the wide-area, streaming, lower sample rate synchrophasor information. Such a combination may provide many new benefits to engineers and electric power system planners. For example, engineers may be able to obtain an overall picture from the synchrophasor information as well as a detailed view of the electric power system from the event information. Also, the synchrophasor information shows the measurements from IEDs not acting during a disturbance. This data, combined with event data from relays that participated, may help engineers understand how close relays approached operating regions. From this, they can refine settings to make the system more reliable in the future. Also, the combined information helps with validating component models. Each disturbance in the power system causes various connected IEDs to respond according to their internal physical and algorithm properties. The combined measurements from events and synchrophasors enables correlating these responses and comparing against expected responses. Such comparison provides an opportunity to improve the models utilized to compute the expected responses. These and many other applications become available when streaming and polled information are combined into a single analysis environment.

The present disclosure describes a system to collect both polled (i.e. event) information and streaming (i.e. synchrophasor) information. The information may be archived, aligned, processed, and displayed in a manner suitable for providing the benefits described above, as well as others. The ability to provide calculations on this information is also described. The ability to export the information into other applications is also described.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

FIG. 1 illustrates a simplified diagram of an example of an electric power delivery system 100 consistent with embodiments disclosed herein. The systems and methods described herein may be applied and/or implemented in the system electric power delivery system 100 illustrated in FIG. 1. Although illustrated as a one-line diagram for purposes of simplicity, an electrical power delivery system 100 may also be configured as a three-phase power system. The electric power delivery system 100 may include, among other things, electric generators 130 and 131, configured to generate an electrical power output, which in some embodiments may be a sinusoidal waveform.

Generators 130 and 131 may be selectively connected to the electric power delivery system using switches or circuit breakers 111 and 171, respectively. Step-up transformers 114 and 115 may be configured to increase the output of the electric generators 130 and 131 to higher voltage sinusoidal waveforms. Buses 122 and 123 may distribute the higher voltage sinusoidal waveform to a transmission line 120 between buses 122 and 123. Step-down transformer 146 may decrease the voltage of the sinusoidal waveform from bus 123 to a lower voltage suitable for electric power distribution on line 142. Distribution line 142 is further selectively connectable to bus 123 via circuit breaker or switch 144, and may distribute electric power to a distribution bus 140. Load 141 (such as a factory, residential load, motor, or the like) may be selectively connected to distribution bus 140 using switch or circuit breaker 170. It should be noted that additional transformers or other equipment may be used to further step down a voltage from the distribution bus 140 to the load 141.

Various other equipment may be included in the electric power delivery system. Also illustrated is switched capacitor bank ("SCB") 174 selectively connectable to transmission bus 123 using circuit breaker or switch 172. Other equipment that may be included in the electric power delivery system may include, for example, static VAR compensators, reactors, load tap changers, voltage regulators, autotransformers, and the like. Some of these are considered as included in the electric power system 100 such as, for example, load tap changers can be considered as part of the load 141. Generators 130 and 131, may be any generator capable of providing electric power to the electric power delivery system, and may include, for example, synchronous generators, turbines (such as hydroelectric turbines, wind turbines, gas-fired, coal-fired, and the like), photovoltaic electric generators, tidal generators, wave power generators, and the like. Such generation machines may include components such as power-electronically coupled interfaces for example doubly-fed induction machines, direct coupled AC-DC/DC-AC transfer devices, and the like. It should be noted that these are not exhaustive lists, and other equipment, machines, and connected devices may be considered under this disclosure.

As mentioned above, modern electric power delivery systems (which may include electric power generation systems, transmission systems, distribution systems, and consumption systems) are controlled using IEDs. FIG. 1 illustrates several IEDs 160-167 that may be configured to monitor and/or to control the one or more elements of the electric power delivery system. An IED may be any processor-based device that monitors and/or controls monitored equipment within an electric power delivery system (e.g., system 100). In some embodiments, the IEDs 160-167 may gather equipment status from one or more pieces of monitored equipment (e.g., generator 130). Equipment status may relate to the status of the monitored equipment, and may include, for example, breaker or switch open or closed, valve position, tap position, equipment failure, rotor angle, rotor current, input power, automatic voltage regulator state, motor slip, reactive power control set point, generator exciter settings, and the like. Further, the IEDs 160-167 may receive measurements concerning monitored machines or equipment using sensors, transducers, actuators, and the like. Measurements may relate to a measured status of the machine or equipment, and may include, for example, voltage, current, temperature, pressure, density, infrared absorption, viscosity, speed, rotational velocity, mass, and the like. With the equipment status and/or measurements, IEDs may be configured to derive or calculate derived values. Such derived values may be any values derived or calculated from the measurements and/or equipment status and may include, for example, power (real and reactive), magnitudes and angles of voltages and currents, frequency, rate of change of frequency, phasors, synchrophasors, fault distances, differentials, impedances, reactances, symmetrical components, alpha components, Clarke components, alarms, and the like.

According to certain embodiments, IEDs 160-167 may issue control instructions to the monitored equipment in order to control various aspects relating to the monitored equipment. Some examples of actions include: opening a breaker which disconnects a generator with a rotor angle moving towards instability; opening a breaker which sheds load that is causing a voltage to decline towards a collapsing condition; opening a breaker to remove an asset when the asset, such as a line or transformer, is exceeding its safe operating limits; opening a breaker which sheds load that is causing the frequency of the system to decline such that it is exceeding predefined operating limits; inserting shunt capacitance with the effect of increasing the voltage on an electric power line so that the reactive requirements on a generator are not exceeded and therefore preemptively preventing the generator from being removed from service by a reactive power control; activating a dynamic brake which counters the acceleration of a machine rotor; adjusting a set-point on a governor to limit the power output of a synchronous machine so that it does not exceed the safe operating limits; simultaneously adjusting set-points of other synchronous machines so that they pick-up the new load; adjusting a voltage regulation set-point of an automatic voltage regulator such that a voltage at a more distant point in the power system does not exceed its maximum or minimum voltage threshold; and the like.

An IED (e.g., IED 160) may be in communication with a circuit breaker (e.g., breaker 111), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device or equipment to perform a certain action, may be generally referred to as control instructions.

IEDs 160-167 may be communicatively linked together using a data communications network 168, and may further be communicatively linked to a central monitoring system, such as a supervisory control and data acquisition (SCADA) system 182, and/or a wide area control and situational awareness (WACSA) system 180. The analysis engine (AE) 183 provides the user interface portion of the system which combines wide-area and local information. In certain embodiments, various components of the electrical power generation and delivery system 100 illustrated in FIG. 1 may be configured to generate, transmit, and/or receive GOOSE messages, or communicate using any other suitable communication protocol.

The illustrated embodiments are connected with communication network 168 at its center, however, other topologies are also contemplated. For example, the IEDs 160-167 may be communicatively coupled directly to the analysis engine 183, SCADA system 182 and/or the WACSA system 180. Certain IEDs, such as IEDs 163 and 164, may be in direct communication with each other to effect, for example, line differential protection of transmission line 120. The data communications network of the system 100 may utilize a variety of network technologies, and may comprise network devices such as modems, routers, firewalls, virtual private network servers, and the like. Further, in some embodiments, the IEDs 160-167 and other network devices (e.g., one or more communication switches or the like) may be communicatively coupled to the communications network 168 through a network communications interface.

Consistent with embodiments disclosed herein, IEDs 160-167 may be communicatively coupled with various points to the electric power delivery system 100. For example, IEDs 163 and 164 may monitor conditions on transmission line 120. IED 160 may be configured to issue control instructions to associated breaker 111. IEDs 163, and 167 may monitor conditions on buses 122, and 123. IED 161 may monitor and issue control instructions to the electric generator 130. IED 162 may monitor and issue control instructions to transformer 114. IED 166 may control operation of breaker 172 to connect or disconnect SCB 174. IED 165 may be in communication with load center 141, and may be configured to meter electric power to the load center. IED 165 may be configured as a voltage regulator control for regulating voltage to the load center using a voltage regulator (not separately illustrated).

In certain embodiments, communication between and/or the operation of various IEDs 160-167 and/or higher level systems (e.g., analysis engine 183 or SCADA system 182 or WACSA 180) may be facilitated by communication network 168. The communication network 168 may also include further IEDs such as an automation controller, central IED, communication processor, access controller, and may include an Ethernet network, fiber optic network, an intranet, the Internet, and the like.

The IEDs 160-167 may communicate a variety of types of information to and through the communication network 168 including, but not limited to, operational conditions, status and control information about the individual IEDs 160-167, event (e.g., a fault) reports, communications network information, network security events, and the like. In some embodiments, the communication network 168 may be directly connected to one or more pieces of monitored equipment (e.g., electric generator 130 or breakers 111, or 172).

The communication network 168 may also be communicatively coupled to a common time source (e.g., a clock) 188. In certain embodiments, the communication network 168 may receive a time signal based on the common time source 188 that may be distributed to communicatively coupled IEDs 160-167. Alternatively, IEDs may be individually connected to a common time source. Based on the time signal, various IEDs 160-167 may be configured to collect and/or calculate time-aligned operational conditions including, for example, synchrophasors, and to implement control instructions in a time coordinated manner. IEDs may use the time information to apply a time stamp to operational conditions and/or communications. In some embodiments, the WACSA system 180 may receive and process the time-aligned data, and may coordinate time synchronized control actions at the highest level of the electrical power generation and delivery system 100. In other embodiments, the communication network 168 may not receive a time signal, but a common time signal may be distributed to IEDs 160-167.

The common time source 188 may also be used by the IEDs 160-167 for time stamping information and data. Time synchronization may be helpful for data organization, real-time decision-making, as well as post-event analysis. Time synchronization may further be applied to network communications. The common time source 188 may be any time source that is an acceptable form of time synchronization, including, but not limited to, a voltage controlled temperature compensated crystal oscillator, Rubidium and Cesium oscillators with or without a digital phase locked loops, microelectromechanical systems (MEMS) technology, which transfers the resonant circuits from the electronic to the mechanical domains, or a Global Navigational Satellite System (GNSS) such as a Global Positioning System (GPS) receiver with time decoding. In the absence of a discrete common time source 188, the communication network 168 may serve as the common time source 188 by distributing a time synchronization signal. Alternatively, each IED 160-167 can keep a local time based on a local time-keeping mechanism. The accuracy of the time source, whether shared among all devices or whether kept locally may impact the accuracy of the display and analysis of information by the analysis engine 183.

Each IED 160-167 communicates both streaming and polled data through communication network 168 and to the analysis engine 183. Polling of data is initiated either by analysis engine 183 or by communication processors part of communication network 168. If polling is initiated by communication processors then analysis engine 183 polls the event data from the communication processor. In this case the polling approach for the analysis engine 183 is identical to polling from IED 160-167 except data for multiple IEDs may be available from the communication processor during a single poll by the analysis engine 183. Streaming of data is initiated either by IEDs 160-167 or by analysis engine 183 but once initiated then the streaming data needs no further prompting for transfer. An example of the streaming protocol is IEEE C37.118-2005. An example of the polling system protocol is that used by the SEL-5045 TEAM event collection system available from Schweitzer Engineering Laboratories, Inc. of Pullman, Wash.

As is detailed above, the electric power delivery system 100 illustrated in FIG. 1 includes local control and protection using IEDs 160-167, and wide-area control using the communication network 168 and/or WACSA 180 and/or SCADA 182. The polled and streamed information from IEDs 160-167 is available for analysis engine 183.

Figure 2A:
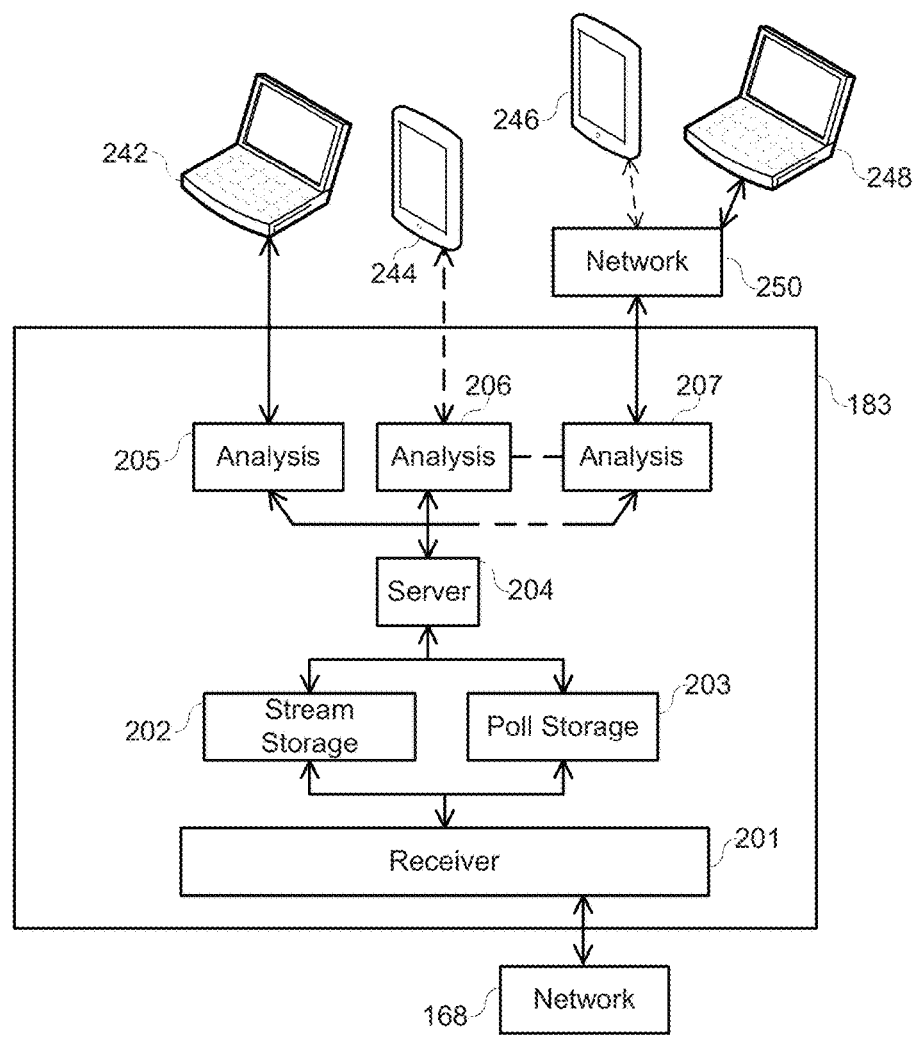
FIG. 2A illustrates a functional block diagram of an analysis engine.

FIG. 2A illustrates a functional block diagram of analysis engine 183. Data is collected by receiver 201. The receiver places streaming data (e.g. time-synchronized, or, synchrophasor data) into the stream storage 202. In one embodiment the streaming interface portion of receiver 201 follows the IEEE C37.118-2005 protocol. The receiver places polled data (e.g. triggered event data) into poll storage 203. The receiver 201 communicates to the polled devices by file transfer, as each event consists of a file of data. In one embodiment the polling interface portion of the receiver 201 is the Schweitzer Engineering Laboratories, Inc. SEL-5045 AcSELerator TEAM® software. In another embodiment the polling interface portion of receiver 201 is a manual file entry process. A set of display 205-207 modules connect to the dual databases 202 and 203 through server module 204. The server module 204 interfaces to both databases 202 and 203 and sends sets of polled and/or streaming data to the analysis modules, one of 205-207, that is requesting the data. The server module 204 can also continuously send data to any of the display modules 205-207 that are requesting to display real-time, continuously updating data. Analysis modules 205-207 may be configured by a user to request, format and provide a representation of the polled and streaming data as described in more detail herein.

The stream storage 202 database is optimized for streaming type data. In one embodiment the stream storage 202 consists of individual files where each file is populated with combined time-stamp and data sets. When data arrives it is stored in the appropriate file according to the time-stamp associated with the data. In this example, each file contains one day of data associated with one of the IEDs 160-167. For example, if eight IEDs are communicating streaming data to analysis engine 183 then there are eight files created each day. If data is streamed at a rate of 60 messages per second, then there are 5,184,000 rows of data in each file. This is because there are 86,400 seconds in a day and there are 60 messages of data received every second. Each row in the file starts with the time-stamp of when the data was sampled. This time-stamp is sent along with the data according to, in one embodiment, the IEEE C37.118-2005 standard. The remainder of the row contains all of the measured data associated with that time-stamp.

For example, IED 163 may send positive sequence voltage as a 32-bit floating point value, positive sequence current as a 32-bit floating point value, the measured frequency as a 32-bit floating point value, the measured rate-of-change of frequency as a 32-bit floating point value, a status byte of information, an analog pressure value as a 32-bit floating point value, and a byte of digital breaker status information. In this case, this set of measured data may be stored in one row of the file, along with the time-stamp at which time it was sampled, according to the IEEE 037.118-2005 standard. If data is received out-of-order, according to its time-stamp then it may be stored in the appropriate row according to its time-stamp, in order of all of the other time-stamps. As such the first second of a new day, sampled at the first 60th instant of that second may be stored first in the file and the last second of that day, sampled at the last 60th instant of that second may be stored last in the file, independently of when they were received. If data for a given time-stamp is not received then that row for that time-stamp may be held blank and not filled.

The poll storage 203 database is optimized for storing sets of files, where each file is polled for acquisition by the database through receiver 201. In one embodiment the database 203 may be a relational database. The event data from IEDs 160-167 may be received in file format such as the Schweitzer Engineering Laboratories Compressed Event Report format or a COMTRADE file format. Each compressed event report file may contain a time-stamp of the event along with a set of sampled data for that event. Each COMTRADE file formats may contain a time-stamp for each data-point. While streaming data may be received continuously, the polled data may be received only when an IED 160-167 triggers an event report. The receiver 201 either polls each IED 160-167 for the availability of an event report that has been triggered or each IED 160-167 may notify the receiver 201 when an event report is available. In either case, the receiver 201 then initiates communication with the appropriate IED 160-167 and subsequently reads the event report file from that IED. Once read the event report is stored in poll storage 203.

The server 204 interacts with each display module 205-207 to select the appropriate data from stream storage 202 or poll storage 203 for display. Each display module 205-207 requests data according to the user preferences. For example, if the user wishes to display all data from date d1 and time t1 and extending to date d2 and time t2, inclusive, then the server 204 pulls data for this time range from stream storage 202 along with either indications of any event data that is available for this time range (if displayed in the manner of FIG. 3A) or the full set of event data that is available for this time range (if displayed in the manner of FIG. 5A), from the polled storage 203. The stream storage 202 data may be directly displayed along with indications of available polled storage 203 data. If the user then selects a particular poll storage data, then the event report for the selected event may be acquired from poll storage 203 for display.

In one embodiment, the display of data can be continuously updating, in real-time, as data is received. For the streaming data, it is selected by server 204 and displayed as it is received. Extending the previous example for the real-time case, the date d1 and time t1 and date d2 and time t2 update as each new data point is received by receiver 201, accepted into stream storage 202, and then immediately sent for display by server 204. In this case, for event data, when data in poll storage 203 is available for the present range (d1,t1) to (d2,t2) then it is immediately sent by server 204 for display. The polled data may be received in real-time by receiver 201 and as long as the time-stamp for polled data is in the range (d1,t1) to (d2,t2) it is sent for display. Because of this functionality, polled data may appear on a display, when received in real-time.

When the data for the event in poll storage 203 contains only a single time-stamp for an entire set of event data (as in the case for certain versions of compressed event report formats) then the server 204 may create time-stamps for each of the data points in the event report, when sending to display 204-207, by calculating the time-stamps from the sample rate and one received time-stamp. For example, the single time-stamp (d1,t1) is for the set of data points {Xi(d1,t1)}, where (d1,t1) is a date d1 and time t1 pair and the set of data points Xi(d1,t1) might be for i=0,1,2 where X0(d1,t1) is the A phase voltage at time-stamp (d1,t1), X1(d1,t1) is the B phase voltage at time-stamp (d1,t1), and X2(d1,t1) is the C phase voltage at time-stamp (d1,t1). The event report also contains the sample rate. In this example let the sample rate be $\frac{1}{240}$th of a second. Then, the time-stamp for the next set of data is created as $t2=t1+\frac{1}{240}$, where t1 and t2 are in units of seconds.

As illustrated in FIG. 2A, analysis modules 205-207 may be in communication with one or more various display devices 242-248. Display devices 242-248 may be any device capable of receiving display information and displaying such information to a user. Display devices 242-248 may be further configured to receive user input and communicate such user input back to the associated analysis module 205-207. As illustrated, analysis module 205 is in wired communication with laptop 242. Analysis module 206 is in wireless communication with tablet computer 244. Analysis module 207 is in communication with a network 250 which may be the same as network 168, or separate from network 168. Tablet computer 246 is in wireless communication with the network 250, and laptop computer 248 is in wired communication with the network 250 to facilitate communication with analysis module 207. Although the illustrated display devices comprise tablet and laptop computers, various other display devices may be used such as, for example, desktop computers, workstations, tablet computers, laptop computers, cell phones, smart phones, personal digital assistants, and the like.

Figure 2B:
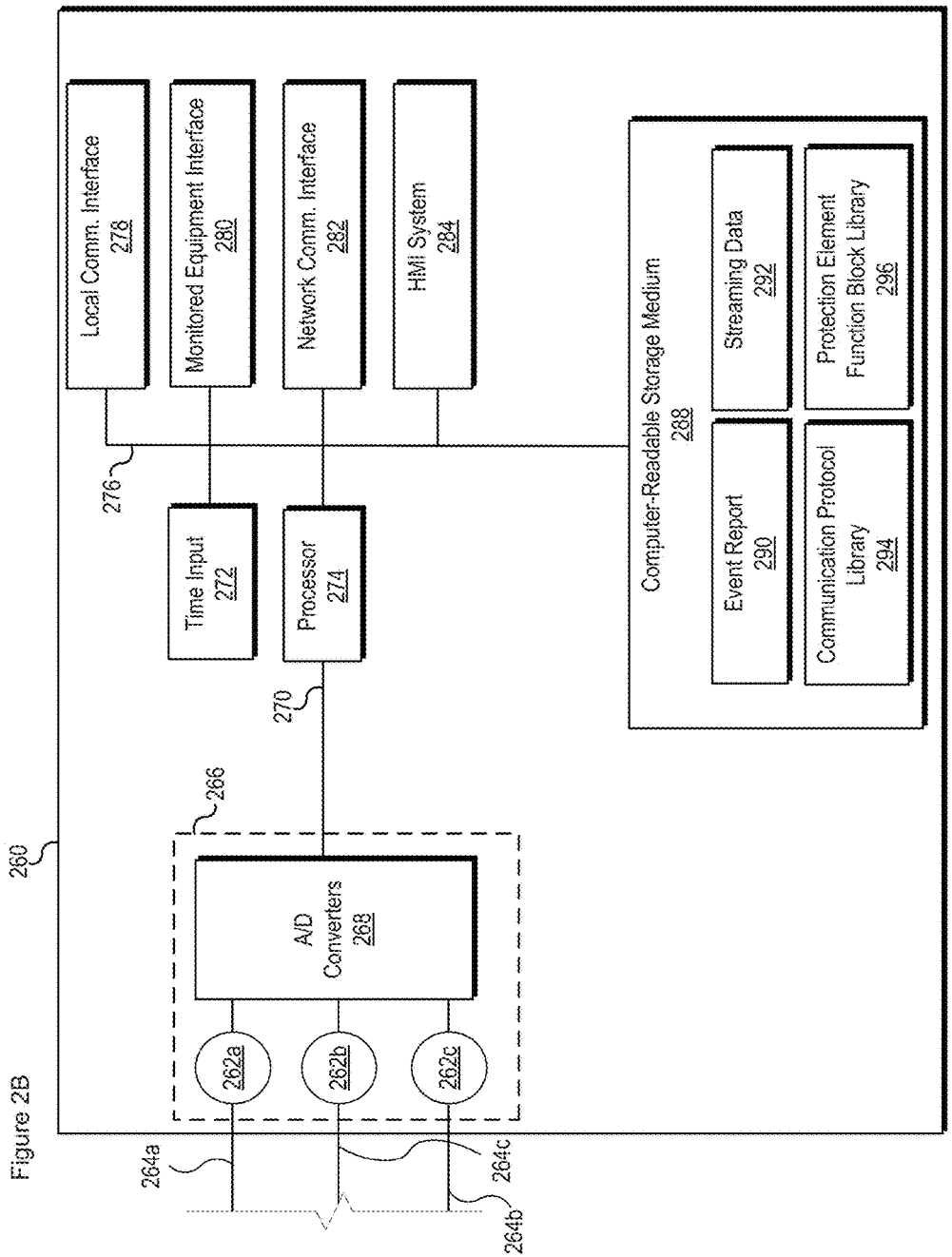
FIG. 2B illustrates a functional block diagram of an intelligent electronic device ("IED") consistent with embodiments of the present disclosure.
Figure 6:
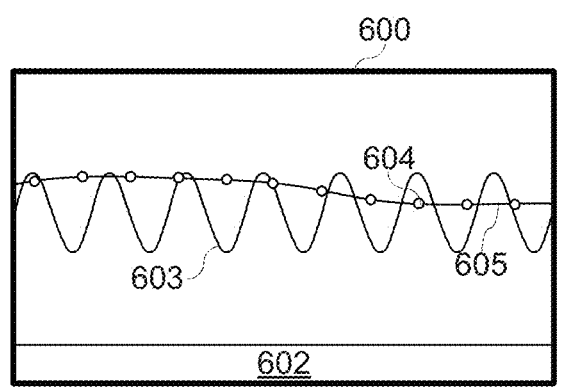
FIG. 6 illustrates a display output of streaming and polled information from the electric power system.

FIG. 2B illustrates a functional block diagram of an IED such as IEDs 160-167 of FIG. 1. IED 600 may be configured to perform a variety of tasks using a configurable combination of hardware, software, firmware, and/or any combination thereof. Although FIG. 6 illustrates an embodiment that includes hardware and software, various embodiments of the present disclosure may be implemented in an embedded system, field programmable gate array implementations, and specifically designed integrated circuit. Software functions described in connection with various software modules may be implemented in various types of hardware. Moreover, certain components or functions described herein may be associated with other devices or performed by other devices. The specifically illustrated configuration is merely representative of one embodiment consistent with the present disclosure.

IED 260 includes a network communications interface 282 configured to communicate with other IEDs and/or system devices such as analysis engine 183. It should be noted that IED 260 may be configured to communicate directly with analysis engine 183, over a communications network, or using intermediary devices such as communications processors. In certain embodiments, the network communications interface 282 may facilitate direct communication with another IED or communicate with another IED over a communications network. The network communications interface 282 may facilitate communications with multiple IEDs. IED 260 may further include a time input 272, which may be used to receive a time signal allowing IED 260 to apply a time-stamp to the acquired measurements, event reports, or other data. In certain embodiments, a common time reference may be received via communications interface 282, and accordingly, a separate time input may not be required for time-stamping and/or synchronization operations. One such embodiment may employ the IEEE 1588 protocol. A monitored equipment interface 280 may be configured to receive status information from, and issue control instructions to, a piece of monitored equipment.

A local communication interface 278 may also be provided for local communication with IED 260. The local communication interface 278 may be embodied in a variety of ways, including as a serial port, a parallel port, a Universal Serial Bus (USB) port, an IEEE 1394 Port, and the like.

In certain embodiments, IED 260 may include a sensor component 266. In the illustrated embodiment, sensor component 266 is configured to gather data directly from a plurality of conductors 264a-c and may use, for example, A/D converters 268 that may sample and/or digitize filtered waveforms to form corresponding digitized current and voltage signals provided to data bus 270. Conductors 264a-c may be electrically connected to an electric power distribution system. In some embodiments transformers (not shown) may reduce the voltage or current to a level appropriate for monitoring using the IED 260. A/D converters 268 may include a single A/D converter or separate A/D converters for each incoming signal. A current signal may include separate current signals from each phase of a three-phase electric power system. A/D converters 268 may be connected to processor 274 by way of data bus 270, through which representations of electrical parameters determined by sensor elements 262a-c may be transmitted to processor 274. In various embodiments, the representations of electrical parameters may represent parameters, such as currents, voltages, frequencies, phases, and other parameters associated with an electric power distribution system. Sensor elements 262a-c may represent a variety of types of elements, such as voltage transformers, current transformers, status inputs, a breaker controller, etc.

In some embodiments, the operation of one or more of sensor elements 262a-c may be selectively enabled based on the configuration of IED 260. Further, a user may be able to enable additional sensor elements after a device is installed using the techniques described herein for upgrading devices. In some embodiments, sensor elements that are selectively enabled or disabled may comprise virtual elements running on processor 274.

Processor 274 may be configured to process communications received via communications interface 282, time input 272, monitored equipment interface 280, and/or sensor component 266. Processor 274 may operate using any number of processing rates and architectures. Processor 274 may be configured to perform various algorithms and calculations described herein. Processor 274 may be embodied as a general purpose integrated circuit, an application specific integrated circuit, a field-programmable gate array, and/or any other suitable programmable logic device.

A Human-Machine Interface (HMI) system 284 may be configured to facilitate interaction between a user and IED 260. In some embodiments, HMI system 284 may comprise one or more of a display, keyboard, mouse, touch-screen, speaker, and the like. In some embodiments, one or more elements of HMI may be selectively enabled by a configuration of IED 260. For example, visualization features may be enabled or disabled based on a configuration setting specified by a filter.

A computer-readable storage medium 288 may be the repository of various software modules configured to perform any of the methods described herein. A data bus 276 may link monitored equipment interface 280, time input 272, communications interface 282, HMI system 284, and computer-readable storage medium 288 to processor 274. Various modules and/or sub-modules may be selectively enabled based on the configuration of IED 260.

A communication protocol library 294 may be configured to allow IED 260 to communicate with any of a variety of external devices using a variety of data communication protocols (e.g., DNP, IEC 61850, MODBUS, IEC 60870, MB, etc.

A protection element function block library 296 may provide various features that may be implemented by IED 260. For example, the protection element function block library 640 may implement, for example, an overcurrent function, an overload function, an over-frequency function, a differential function, and the like. One or more protection element functions may be selectively enabled based on one or more configuration setting. For example, where IED 260 is configured to monitor for an overcurrent condition, the overcurrent function may be enabled from the various functions provided by the protection element function block library 640. Moreover, the protection element function blocks may be enabled and combined in various combinations to achieve a desired feature set.

An event report module 290 may be configured to format and store event reports in a computer-readable storage medium. For example, the IED may be configured to store electric power system data at a high resolution for a certain time buffer. Once an event has been identified by, for example, the protection block, the event report module 290 may be configured to format and store an event report consisting of a selected portion of the stored power system data at a high resolution in the buffer for a preselected time period before and after the event. The event may be stored for later retrieval by the analysis engine. The event report may be stored according to one or more various protocols or file formats such as, for example, a COMTRADE file format.

A streaming data module 292 may be configured to apply time stamps to certain electric power system measurements obtained using the sensor component, and to transmit this streaming data using the network communications interface 282. As described in more detail herein, the streamed data may be lower resolution data to be streamed to subscribing devices. The streaming data module 292 may be configured to format the streamed data according to one or more protocols or file formats such as, for example, the IEEE C37.118 protocol.

Figure 3A:
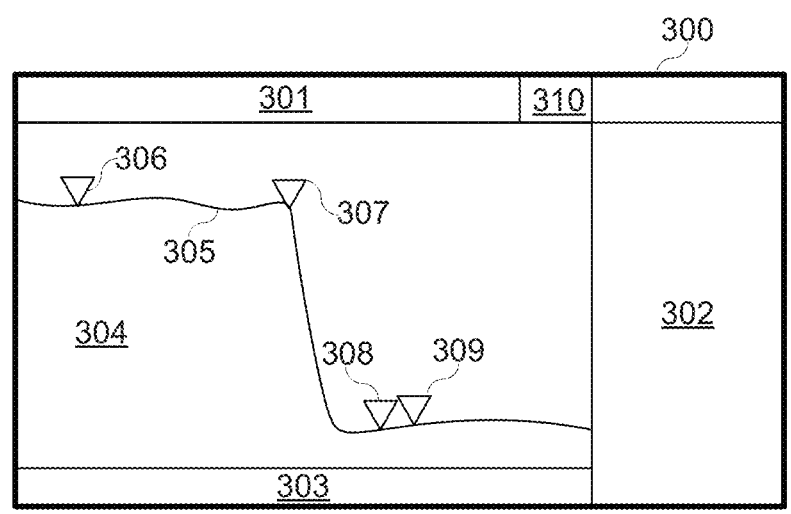
FIG. 3A illustrates a display output from a system for combining and analyzing polled and streamed electric power system information.

FIG. 3A shows one embodiment of the display 300 of data. The display information in FIG. 3A can be displayed on a computer monitor, laptop monitor, portable pad style device, cell phone, or other media. The diagram in FIG. 3A represents locations and types of data on the visual display device.

The time range bar 301 shows a date and time representation of the range of available data. For example, if data is available from Mar. 8, 2013 to May 4, 2013 then the time-scale representation covers this range. The purpose of the time range bar is to give the user an overall view of the range of data available. This time range bar is shown as an example of one possible way to display the data that is available in the database. Other implementations are possible.

The auxiliary data viewing pane 302 shows information such as status of the data, type of event report, alarms, search window, equation editor, and other features. The auxiliary data viewing pane 302 is presented for illustration purposes. Many other approaches to displaying this information are possible.

The timeline bar 303 shows the time-stamps associated with the presently displayed data 305-309. For example, if 120 data points are displayed as part of the streaming data 305, ranging from May 4, 2013 at 8:00 AM to May 4, 2013 at 8:02 AM, then this range of times are displayed in the timeline bar. This timeline bar is shown as an example of one possible way to display the time stamps of the data. Other implementations are possible.

The data chart 304 shows both streaming data 305 as well as event availability indicators 306-309. The data is updated either continuously, in real-time mode, or user driven, in offline mode. The selection icon 310 switches from offline to real-time mode.

Shown in FIG. 3A is the power system frequency during a loss of generation, where the streaming data 305 in this specific example is for frequency data. Other data such as voltage magnitude, current magnitude, temperature, pressure, voltage angle, current angle, real power, reactive power, fluid level, or the like can also be displayed as the streaming data 305, depending on the user selection and the available data in the stream storage 202. It is also possible to display multiple streaming data simultaneously. It is also possible to have multiple instances of data chart 304 displayed simultaneously, each with individually selected streaming data displayed. The data can be displayed as points, curves, interpolated curves, individually or combined.

The streaming data 305 in FIG. 3A, for this example, is the frequency data that was received by one of the IEDs 160-167, acquired by receiver 201, placed in stream storage 202, and then displayed through server 204 and by one of the analysis applications 205-207. The frequency starts at a higher level in this example and then steps to a lower level.

Simultaneously, the server 204 discovers all event data available in poll storage 203 for the time range of the displayed streaming data 305 and displays indicators 306-309 that event report files are available. These event reports become visible by the user clicking on an indicator 306-309.

Figure 3B:
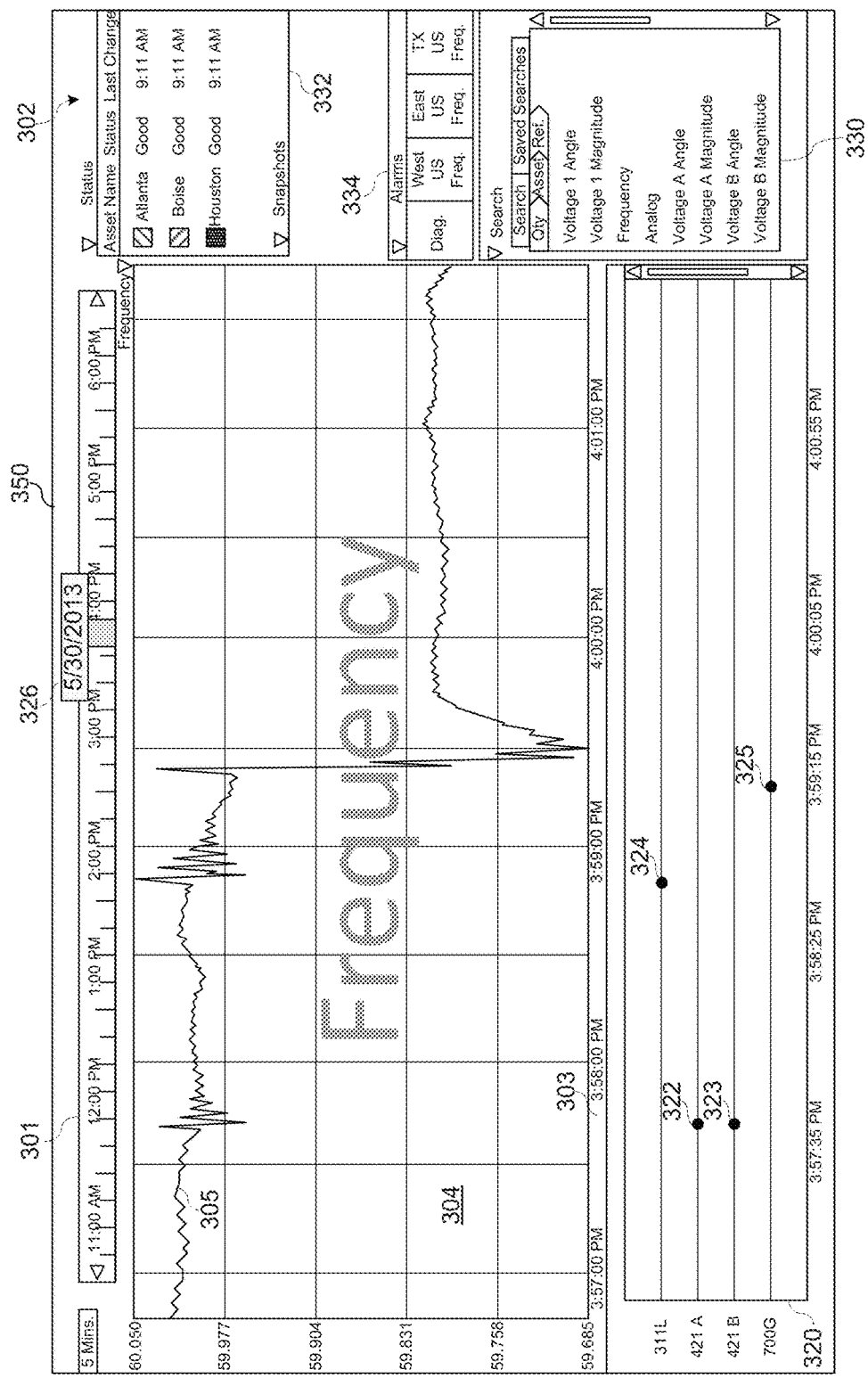
FIG. 3B is a screen capture of a display similar to the display illustrated in FIG. 3A.

FIG. 3B illustrates a more detailed embodiment of the display 350 similar to that illustrated in FIG. 3A. In addition to the elements illustrated in FIG. 3A, the display 35 of FIG. 3B also includes a time range bar 301 that also includes a time slide 326 indicating the time range of the data chart 304. A user may customize the display by moving the time slide 326, or expanding or contracting the time slide 326. In other embodiments, a user may customize the display by entering the time range, which is reflected by the time slide 326. The display 350 of FIG. 3B also includes additional items in the viewing pane 302 such as a location key 332, an alarm panel 334, and a data selector panel 330. The user may interact with the location key 332, alarm panel 334, and data selector panel 330 to choose what is displayed on the data chart 304.

The display 350 of FIG. 3B also may include an events display 320 that includes various devices such as the 311L, 421 A, 421 B, and 700G, a timeline, and indicators 322-325 of when the particular device indicates an event. For example, the 421 A and 421 B devices indicated events 322, 323 at a first time, device 311L indicated an event 324 at a second time, and device 700G indicated an event 325 at a third time.

Figure 4A:
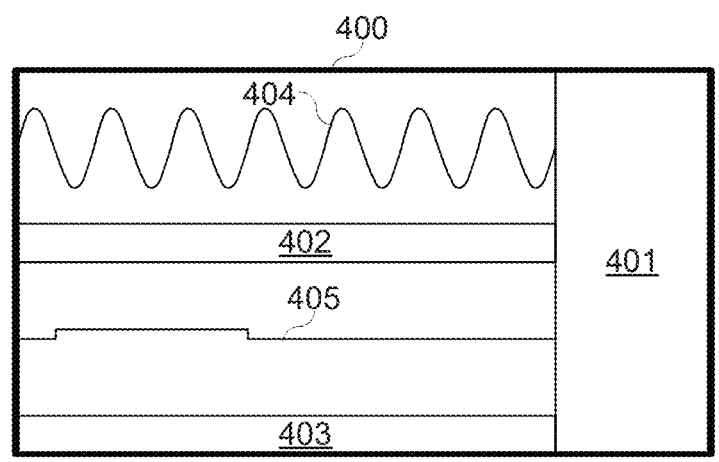
FIG. 4A illustrates a display output from a system for combining and analyzing polled and streamed electric power system information.

FIG. 4A shows one embodiment of the display 400 of event data. This display may become visible when one or more of the indicators 306-309 (of FIG. 3) is selected. For any of the indicators selected, the associated data is acquired from poll storage 203 by server 204 and sent to the analysis module 205-207 for which the indicator 306-309 was selected. The auxiliary data viewing pane 401 shows information such as status of the data, type of event report, alarms, search window, equation editor, and the like. The auxiliary data viewing pane 401 is presented for illustration purposes. Many other approaches to displaying this information are possible.

The timeline bars 402-403 may show the time-stamps associated with the presently displayed data 404-405. For example, if 100 data points are displayed as part of the polled data 404, ranging from May 4, 2013 at 8:00 AM to May 4, 2013 at 8:01 AM, then this range of times may be displayed in the timeline bar. This timeline bar is shown as an example of one possible way to display the time stamps of the data. Other implementations are possible.

The displayed data 404 in this example is a sinusoidal waveform of the power system voltage on a piece of power system equipment such as a specific phase of the power line 120 of FIG. 1. The displayed data 405 in this example is a digital waveform of the breaker position 172. It is possible to display other power system data such as voltage instantaneous values, current instantaneous values, temperature, pressure, voltage magnitude or phase, current magnitude or phase, real power, reactive power, fluid level, and other measured values. It is also possible to display user calculated values. Multiple sequence of values can be displayed. The data can be displayed as points, curves, interpolated curves, individually or combined.

Figure 4B:
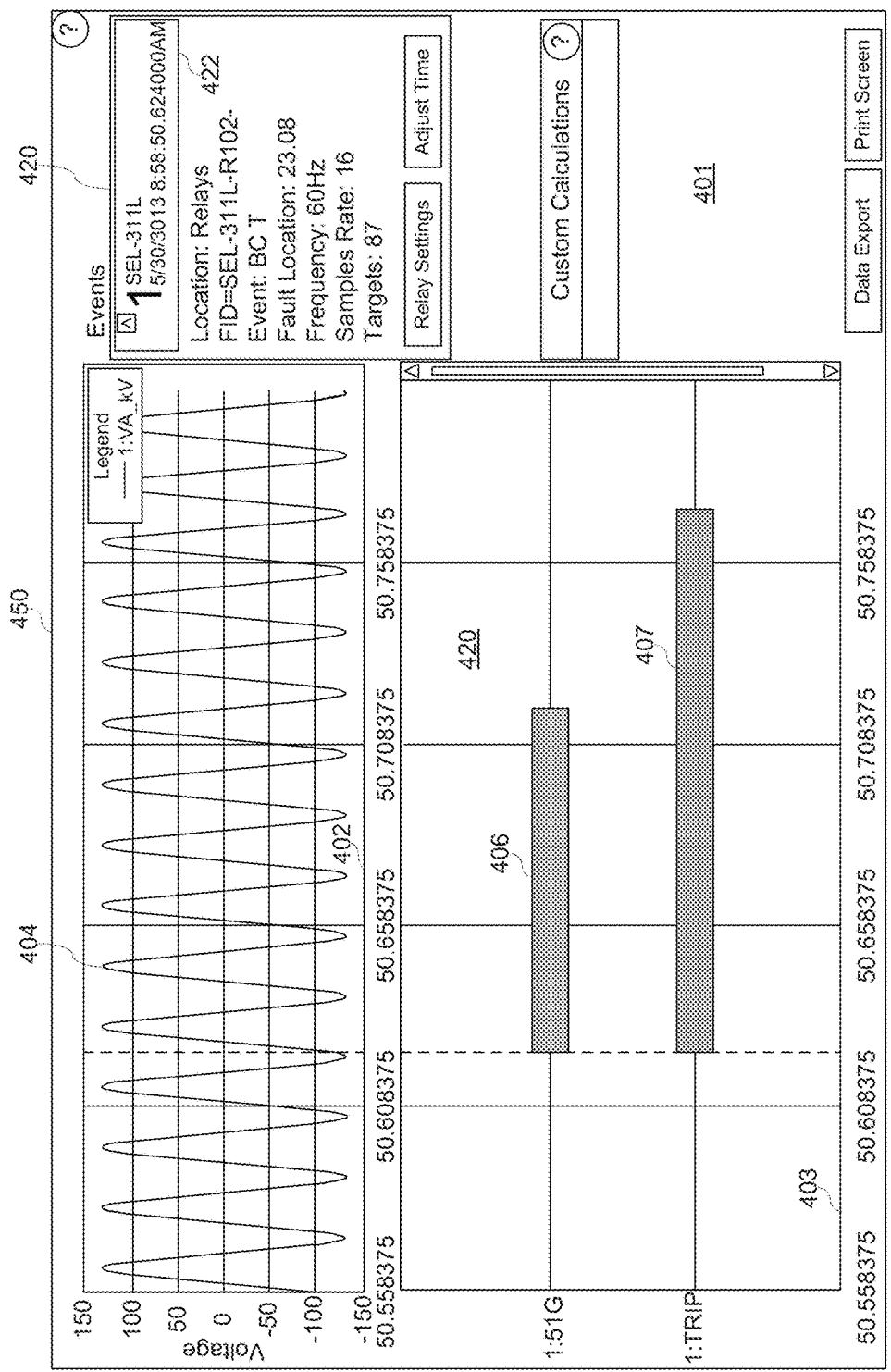
FIG. 4B is a screen capture of a display similar to the display illustrated in FIG. 4A.

FIG. 4B illustrates a screen capture 450 of a display similar to that illustrated in FIG. 4A, further illustrating additional details that may be included in the display 450. For example, similar to FIG. 3B, the display 450 may include an events display 420 that lists certain protection elements such as 1:51G and 1:TRIP, along with indications 406 and 407 of when such elements pick up relative to timeline 403. As displayed, both elements 1:51G and 1:TRIP pick up at a first time, where element 1:51G drops out at a second time and element 1:TRIP drops out at a third time. Viewing pane 401 may include an events pane 420 showing an indication of the displayed event 422 and details of such event, such as the location, type of event, location of a fault, power system frequency, sample rate, and the like. Viewing pane 401 may also include other display windows such as a custom calculations pane, and the like. A user may interact with such displays.

Figure 5A:
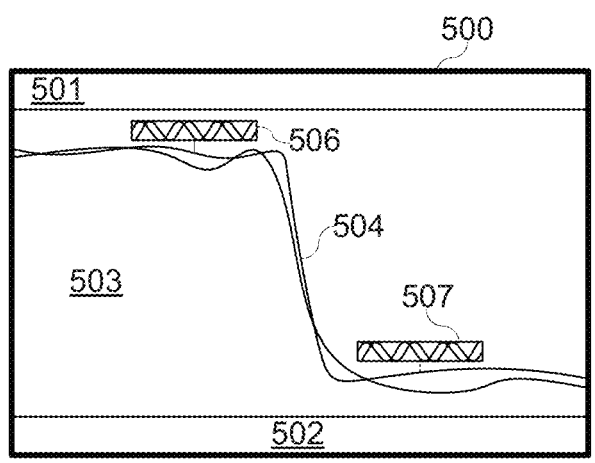
FIG. 5A illustrates a display output from a system for combining and analyzing polled and streamed electric power system information.

An alternate display 500 of the streaming and polled information is shown in FIG. 5A. The time range bar 501 shows a date and time representation of the range of available data, similar to the time range bar 301. The timeline bar 502 shows the time-stamps associated with the presently displayed data 504-507, similar to timeline bar 303. The data chart 503 shows both streaming data 504 as well as event information 506-507. The data is updated either continuously, in real-time mode, or user driven, in offline mode. The streaming data 504 shows two waveforms, representing, in this example the frequency at two different locations of the power system. For example, one could be for the frequency measured by IED 163 and one could be for the frequency measured by IED 167. The event information 506-507 in this embodiment is displayed as small versions of the full polled event data. For example, event information 506 could be from an event report file from IED 165 of FIG. 1 and event information 507 could be from an event report file from IED 166 from FIG. 1. It is also possible for event information 506 and event information 507 to be from the same IED, for example IED 163 of FIG. 1. In this case, the user views the event information in the small window, and can click on the small window to bring up display as shown in FIG. 4A, or it is possible to resize the event window 506 or 507 directly.

Figures 3B, 5B:
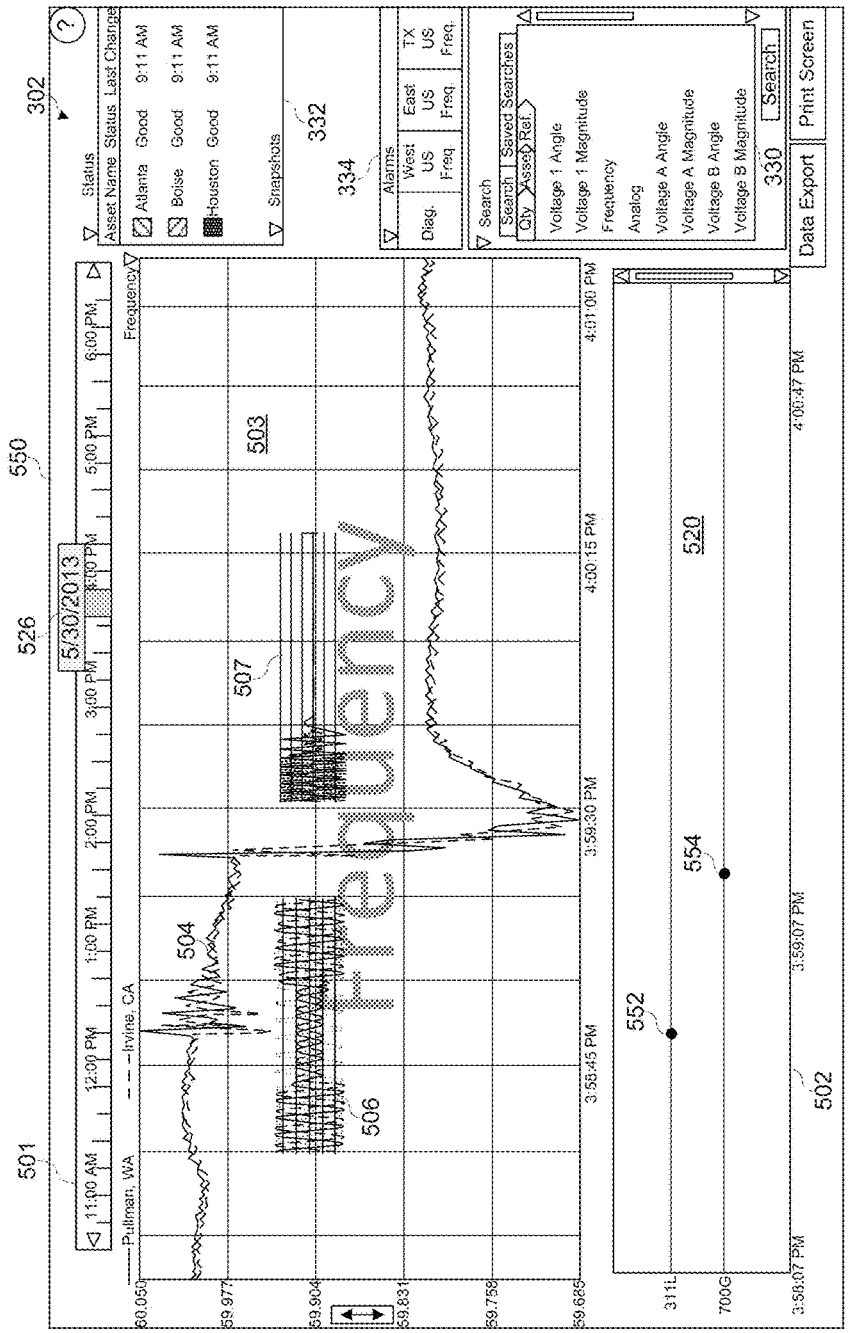
FIG. 5B is a screen capture of a display similar to the display illustrated in FIG. 5A.

FIG. 5B illustrates a display 550 similar to that illustrated in FIG. 5A. As with display 35 of FIG. 3B, display 550 of FIG. 5B may include a time slide 526 in time range bar 501 indicating the time range of the data chart 503. A user may customize the display by moving the time slide 526, or expanding or contracting the time slide 526. In other embodiments, a user may customize the display by entering the time range, which is reflected by the time slide 526. The display 550 of FIG. 5B also includes additional items in the viewing pane 302 such as a location key 332, an alarm panel 334, and a data selector panel 330. The user may interact with the location key 332, alarm panel 334, and data selector panel 330 to choose what is displayed on the data chart 304.

Display 550 further includes an events display 520 that includes various devices such as the 311L and 700G, a timeline, and indicators 552 and 554 of when the particular device indicates an event. For example, the 311L device indicated an event 552 at a first time, and the 700G device indicated an event 554 at a second time.

An alternate display 600 of streaming and polled information is shown in FIG. 6. FIG. 6 shows one embodiment of the display of event data 603 along with streaming data points 604 and interpolated streaming data points 605. This display becomes visible when one or more of the indicators 306-309 is selected, or when one of the event information 506-507 is selected. For all indicators selected, the associated data is acquired from poll storage 203 by server 204 as well as from streaming storage 202 by server 204 and sent to the analysis application 205-207 for which the indicator 306-309 or event information 506-507 was selected. The timeline bar 602 shows the time-stamps associated with the presently displayed data 603-605. For example, if 100 data points are displayed as part of the polled data 603, ranging from May 4, 2013 at 8:00 AM to May 4, 2013 at 8:01 AM, then this range of times are displayed in the timeline bar. This timeline bar is shown as an example of one possible way to display the time stamps of the data. Other implementations are possible.

The displayed data 603 in this example is a sinusoidal waveform of the power system voltage on a specific phase of the power line 120. It is possible to display other power system data such as voltage instantaneous values, current instantaneous values, temperature, pressure, voltage magnitude or phase, current magnitude or phase, real power, reactive power, fluid level, and other measured values. Displayed data 603 can also represent digital values in FIG. 6. It is also possible to display user calculated values. Multiple sequence of values can be displayed. The data can be displayed as points, curves, interpolated curves, individually or combined.

The streaming data 604 in this example is a phase angle for the current of the power line 120. It is possible to display other power system data such as voltage magnitude, current magnitude, temperature, pressure, voltage angle, current angle, real power, reactive power, fluid level, and other values. The streaming data 604 is each associated with a time stamp, according to storage in streaming storage 202. The interpolated data 605 allows data for multiple rates to be displayed together.

Figure 7:
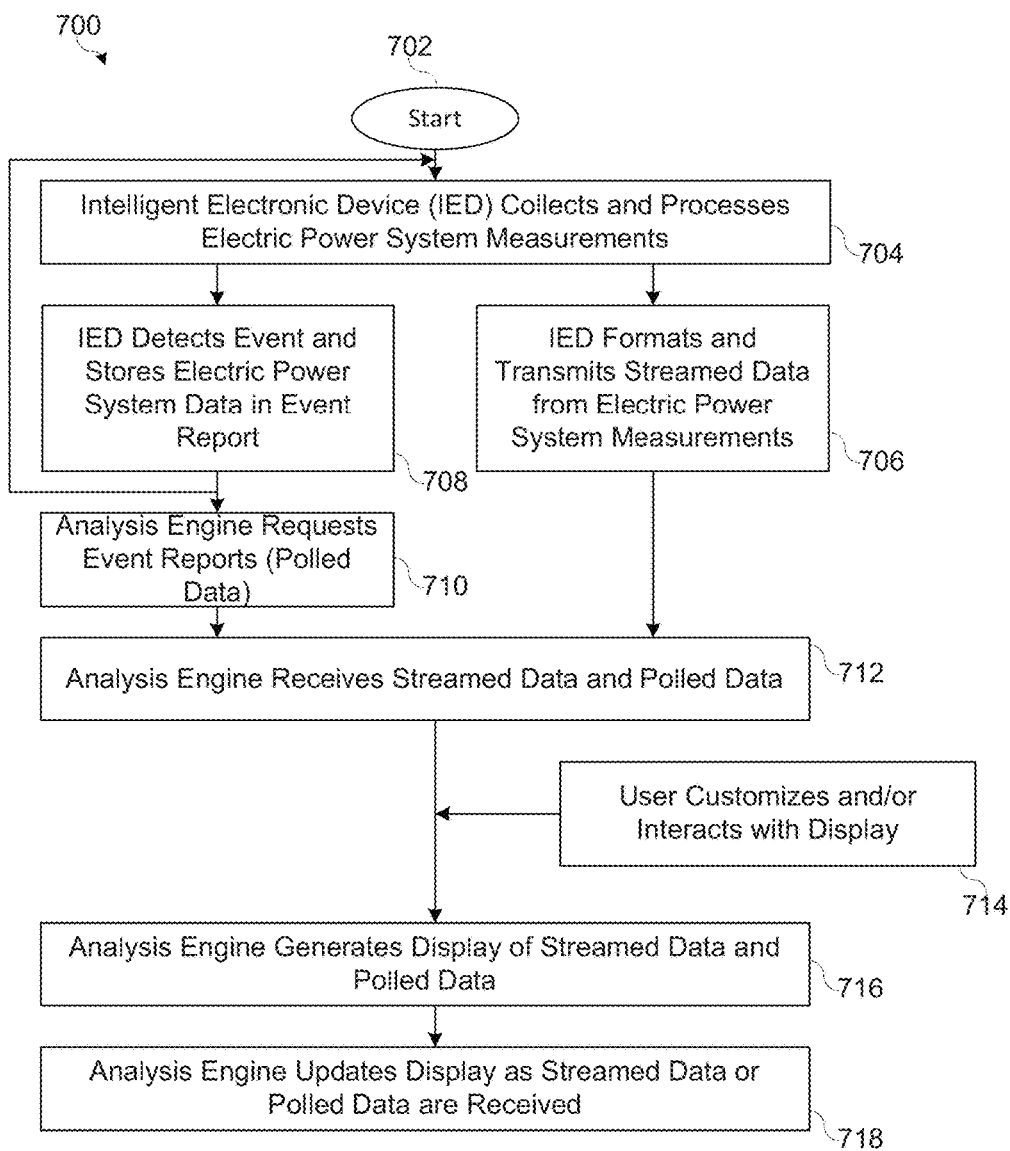
FIG. 7 illustrates a method for combining and displaying polled and streamed electric power system information.

FIG. 7 illustrates a method 700 for combining and displaying polled and streamed electric power system information. The method 700 starts 702 with one or more IEDs collecting and processing electric power system measurements 704. The IEDs may be such as the IEDs 160-167 of FIG. 1 in communication with various electric power system equipment such as the equipment illustrated in FIG. 1. The IEDs may, as described herein, obtain measurements from the electric power system, sample and filter the measurements to produce data, and perform various monitoring and protection functions using the data. Results of the various monitoring and protection functions may be used by the IED to detect an event and store the electric power system data in an event report, which may be referred to as polled data 708. In addition to the detection of events, the IED may perform monitoring functions using the electric power system measurements, and may format and transmit streamed data from the electric power system measurements 706 to consuming devices. As mentioned herein, such streamed data may be in the form of synchrophasor information according to, for example, the IEEE C37.118 protocol. It should be noted that the event reports store more detailed data than the streamed data.

An analysis engine may be a consuming device of the streamed data, and may also request event reports 710. The analysis engine receives the streamed data and the polled data 712. As detailed further herein, the analysis engine may store the streamed data and polled data in non-transitory computer-readable storage media. A user may customize or interact with a display of the analysis engine 714. The analysis engine may generate a display of the streamed data and the polled data 716, which may be according to the user customization or interaction, or may be from a preconfigured set of displays. The analysis engine may continuously update the display as streamed data or polled data are received 718.

Although the examples given primarily relate to time-series data, other display methods that combine the streaming and polled data may be used. In one embodiment, the streaming data for voltage magnitudes is displayed on a geographical map as contours. The contours are two dimensional interpolations of the voltage magnitude data. So, each individual voltage magnitude is associated with the geographical location where it was sampled, and then the contours are spatially interpolated from those points. The contours on the map update for each streaming sample that is received from stream storage 202, either in real-time or from a historical query. The polled data from poll storage 203 are displayed on the same geographical map and selecting an event indicator results in a separate display, for example, FIG. 4A, showing the polled data associated with the selected location and for the selected time.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system for monitoring an electric power delivery system by gathering streamed and polled data therefrom, comprising:
a plurality of intelligent electronic devices ("IEDs") each in electrical communication with the electric power delivery system for obtaining electric power measurements from a plurality of portions of the electric power delivery system, each IED of the plurality of IEDs comprising a processor and a computer-readable storage medium that includes instructions that when executed cause the IED to:
format streaming data using the obtained electric power measurements for streaming transmission;
stream the streaming data according to a streaming protocol without continuous request;
record polled data, and
upon request transmit the recorded polled data;
a communications network in communication with each of the plurality of IEDs receiving therefrom the streamed data and upon request the polled data;
an analysis engine in communication with the communications network including:
a receiver in communication with the communication network, comprising:
a streaming interface configured to receive the continuous stream of streaming data; and
a polling interface configured to issue poll requests to selected IEDs of the plurality of IEDs and receive the polled data;
a processor;
a non-transitory computer-readable storage medium in communication with the receiver and the processor, the computer-readable storage medium including instructions that when executed cause the analysis engine to:
store the streaming data and the polled data;
format a portion of the streaming data and a portion of the polled data into a single representation;
a server in communication with the non-transitory computer-readable storage medium and the network configured to serve polled data and streaming data to the processor; and, a display device in communication with the analysis engine and configured to receive the single representation and to display the single representation to a user.

2. A system for monitoring electric power delivery, comprising:
a plurality of intelligent electronic devices ("IEDs") in electrical communication with an electric power delivery system for obtaining electric power measurements from the electric power delivery system, each IED of the plurality of IEDs comprising a processor and a computer-readable storage medium that includes instructions that when executed cause the IED to:
format streaming data using the obtained electric power measurements for streaming transmission;
stream the streaming data according to a streaming protocol without continuous request;
record polled data, and
upon request transmit the recorded polled data;
an analysis engine in communication with the plurality of IEDs configured to receive therefrom the streaming data and upon request the polled data; the analysis engine including:
a processor;
a non-transitory computer-readable storage medium for receiving and storing the polled data upon request and receiving the continuous stream of streaming data without continued request, and including instructions that when executed cause the processor to format a portion of the streaming data and a portion of the polled data into a single representation; and
a server in communication with the storage media, configured to serve polled data and streaming data to the storage media; and
a display device in communication with the analysis engine and configured to receive the single representation and to display the single representation to the user.

3. The system of claim 2, wherein the single representation comprises at least one graphical illustration of each of the streaming data and the polled data.

4. The system of claim 2, wherein the single representation comprises a time bar indicating the time of displayed information.

5. The system of claim 2, wherein the single representation comprises one selected from the group consisting of: a data status indicator; and event report type indicator; a search window; an equation editor; and combinations thereof.

6. The system of claim 2, wherein the single representation comprises time stamps for displayed data.

7. The system of claim 2, wherein the single representation is automatically updated as the analysis engine receives additional streaming data or polled data.

8. The system of claim 2, wherein the single representation comprises information available in an off-line mode.

9. The system of claim 2, wherein the single representation is configurable between an off-line mode and an updating mode.

10. The system of claim 2, wherein the single representation comprises one or more sets of information selected from the group consisting of: voltage, current, temperature, pressure, angle, real power, reactive power, fluid level, and combinations thereof.

11. The system of claim 2, wherein the single representation comprises equipment status.

12. The system of claim 11, wherein the single representation of equipment status comprises a time stamp.

13. The system of claim 2, wherein the single representation comprises streaming data with indicators of available polled data.

14. The system of claim 13, wherein the display device allows a user to select an available polled data, and the display device is configured to display the polled data upon selection.

15. The system of claim 14, wherein the display device is configured to request the selected polled data from the analysis engine upon selection by a user.

16. The system of claim 2 wherein the single representation comprises voltage magnitude contours of a geographical area.

17. The system of claim 2, wherein the display device allows a user to select a time period, and the display device is configured to display the selected time period.

18. The system of claim 17, wherein the display device is configured to request data from the analysis engine corresponding with the selected time period upon selection by a user.

19. The system of claim 2, further comprising a communications processor in communication with the plurality of IEDs and with the analysis engine, the communications processor configured to receive the streamed data from the IEDs, request and receive from the IEDs the polled data, and transmit the streamed data and the polled data to the analysis engine.

20. An analysis engine for monitoring electric power, comprising:
a receiver:
in communication with a plurality of intelligent electronic devices ("IEDs") each in electrical communication with an electric power delivery system for obtaining electric power measurements from a plurality of portions of the electric power delivery system; and,
for receiving a continuous stream of streaming data from the IEDs without continued request corresponding to electric power delivery system measurements and polled data from the IEDs upon request corresponding to electric power system measurements and an electric power system event;
a polled data non-transitory computer-readable storage medium for storing the polled data upon receipt following request;
a streaming data non-transitory computer-readable storage medium for continuously storing the continuous stream of streaming data;
a processor;
a computer-readable storage medium that includes instructions that when executed cause the analysis engine to:
format a portion of the streaming data and a portion of the polled data into a first single representation, and to transmit the single representation to a first display device for generating a first display to a user; and,
a server in communication with the storage media, configured to serve polled data and streaming data to the processor.

21. The analysis engine of claim 20, wherein the computer-readable storage medium further comprises instructions that when executed cause the analysis engine to format another portion of the streaming data and another portion of the polled data into a second single representation, and to transmit the second single representation to a second display device for generating a second display.

22. A method for monitoring an electric power delivery system, comprising:
  obtaining measurements from different portions of the electric power delivery system by a plurality of intelligent electronic devices ("IEDs") each in electrical communication with the different portions of the electric power delivery system;
  transmitting a continuous stream of streamed data from the obtained measurements without continued request for the stream of streamed data;
  detecting an event and storing polled data from the obtained measurements by the plurality of IEDs;
  continuously receiving the streamed data without continuous request;
  requesting the polled data;
  an analysis engine receiving the polled data;
  the analysis engine storing the streamed data without continued request and the polled data upon receipt following request;
  generating a single representation using at least a portion of each of the streamed data and the polled data;
  transmitting the single representation to a display device; and,
  displaying the single representation to a user.

* * * * *